J. G. HÄNSLER.
SHAFT COUPLING.
APPLICATION FILED MAY 15, 1906.

992,352.  Patented May 16, 1911.

Witnesses:
E. O. Hildebrand
May Taylor

Inventor:
Johann Georg Hänsler
by George Massie
Attorney

UNITED STATES PATENT OFFICE.

JOHANN GEORG HÄNSLER, OF MUNICH, GERMANY.

SHAFT-COUPLING.

992,352.    Specification of Letters Patent.     Patented May 16, 1911.

Application filed May 15, 1906. Serial No. 316,968.

*To all whom it may concern:*

Be it known that I, JOHANN GEORG HÄNSLER, engineer, citizen of Germany, residing at Mannhardtstrasse 7/1, Munich, Germany, have invented certain new and useful Improvements in Shaft-Couplings; and I do hereby declare the following to be a full, clear, and exact description of the invention, such as will enable others skilled in the art to which it appertains to make and use the same.

This invention relates to shaft couplings and the like and has for its object the provision of a simple device which may be readily placed in position or removed so as to disassociate the parts.

The invention, as hereinafter more fully described and as particularly set out in the claims, will be readily understood by reference to the accompanying drawing in which a preferred embodiment of the same is illustrated.

Figure 1:
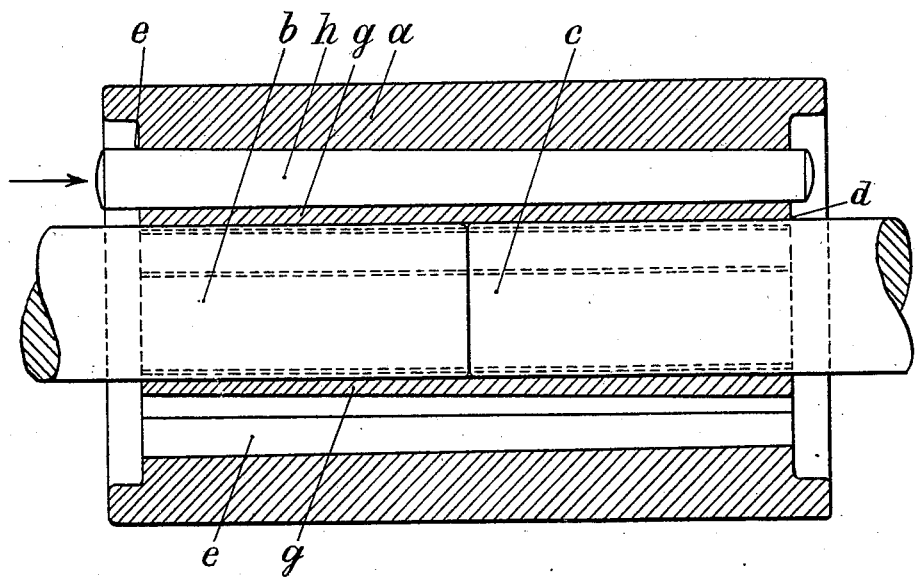
Figure 2:
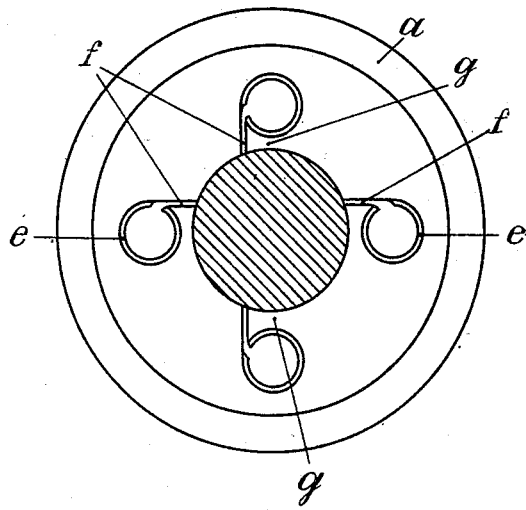

In these drawings: Figure 1 is a longitudinal section of the coupling as applied; and Fig. 2 is an end view.

A sleeve $a$ of wrought iron is provided, for the purpose of coupling the adjacent ends of two shafts $b$ and $c$, with a central bore $d$ of a size adapted to receive and snugly embrace the said shafts. Arranged about the central bore $d$ are a plurality of conical round holes or channels $e$ extending the full length of the sleeve in the same general direction as the central bore. Slots $f$ extend tangentially from these conical channels inwardly to the central bore, thus leaving resilient flaps or jaws $g$ between the channels and central bore.

The operation of coupling the shafts may be as follows: The sleeve is slipped over one shaft end for one-half its length; the other shaft end is then inserted from the opposite end of the sleeve until the shaft ends meet within the sleeve. Conical or wedge shaped pins $h$ are then inserted in the several channels $e$ and driven home, thus expanding the walls of the channels and pressing the flaps $g$ firmly against the shafts, clamping the same firmly and preventing any relative movement between the two shafts or between the same and the sleeve. When it is desired to remove a coupling, a blow of the hammer upon the smaller ends of the pins will cause a loosening of the grip of the flaps $g$, whereupon either shaft may be removed from the sleeve.

A shaft coupling, constructed as above described, possesses many advantages over the more complicated devices heretofore used and may be made of wrought iron, steel or other material best suited to the purpose.

Having thus described my invention, what I claim as new and desire to secure by Letters Patent is:

1. In a shaft coupling, an integral sleeve having a central bore fitted to snugly receive the shaft ends, said sleeve provided with a plurality of tapered channels extending in the general direction of the shaft and with slots extending tangentially from the channels in the direction of and to the central bore.

2. In a shaft coupling, an integral sleeve having a central bore fitted to snugly receive the shaft ends, said sleeve provided with a plurality of tapered channels extending throughout the length of the sleeve in the general direction of the shaft and with slots co-extensive with the channels and extending tangentially therefrom in the direction of and to the central bore.

In testimony whereof I hereunto affix my signature in the presence of two witnesses.

JOHANN GEORG HÄNSLER.

Witnesses:
 EDUARD ANTCUER,
 LOUIS F. MUELLER.

---

Copies of this patent may be obtained for five cents each, by addressing the "Commissioner of Patents, Washington, D. C."